Figure 1:
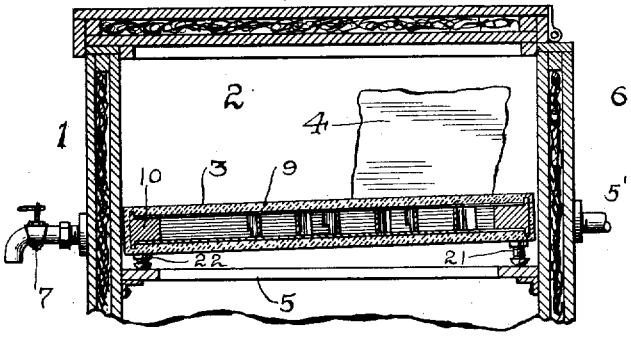

W. F. KEYES.

ICE REST AND WATER COOLER.

APPLICATION FILED AUG. 9, 1911.

Reissued Jan. 20, 1914. 13,679.

Witnesses
Robert McCreadie
Edward F. Wilson

Inventor
Walter F. Keyes
by [illegible] Atty.

COLUMBIA PLANOGRAPH CO., WASHINGTON, D. C.

UNITED STATES PATENT OFFICE.

WALTER F. KEYES, OF LA GRANGE, ILLINOIS.

ICE-REST AND WATER-COOLER.

13,679. Specification of Reissued Letters Patent. Reissued Jan. 20, 1914.

Original No. 995,791, dated June 20, 1911, Serial No. 576,034. Application for reissue filed August 9, 1911. Serial No. 643,255.

*To all whom it may concern:*

Be it known that I, WALTER F. KEYES, a citizen of the United States, and residing at La Grange, Cook county, Illinois, have invented certain new and useful Improvements in Ice-Rests and Water-Coolers, of which the following is a specification.

My invention relates to improvements in ice rests and water coolers for refrigerators, ice boxes, and the like.

One of the objects of my invention is to provide a water-cooler for refrigerators of such construction and arrangement that refrigerating space within the refrigerator otherwise valuable will not be encroached upon for water-cooling purposes.

A further object of my invention is to provide a water-cooler which shall also serve as an ice rest and wherein the contained water shall be so controlled in its movements that when the water is being withdrawn the warmer inflowing water will be prevented from escaping through the outlet in advance of the chilled water, and when the outlet is closed the contained water shall be free to circulate throughout the chamber in response to local differences of temperature therein.

Another object of my invention is to so protect the water containing chamber that sudden changes of temperature or the rapid transfer of heat to or from the water shall be prevented; in other words, it is my object to interpose a medium between the contained water and the contiguous contents of the refrigerator which is slow or sluggish in its response to temperature changes.

Other and further objects of my invention will appear hereinafter.

My invention consists in a water-cooler or ice rest for use in refrigerators provided with a closed water cooling chamber having an inlet and an outlet and divided into a series of relatively narrow cells connected at their ends to permit a substantially free circulation of the contained water at times when the outlet is closed and provided with automatically acting valves to prevent such free circulation when water is being withdrawn through the outlet and to cause the water at such times to flow through the chamber from the inlet to the outlet in a single path of relatively small cross-sectional area.

My invention also consists in an ice rest for refrigerators provided with a water-containing chamber having an inlet and an outlet, and having a covering or casing which prevents the rapid transfer of heat to or from the water.

My invention also consists in the several features of construction and in the combination and arrangement of parts, whereby the above mentioned and other objects are attained, and all as hereinafter described and particularly pointed out in the appended claims.

Figure 5:
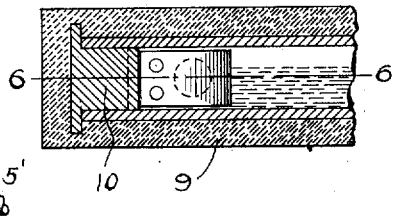
Figure 6:
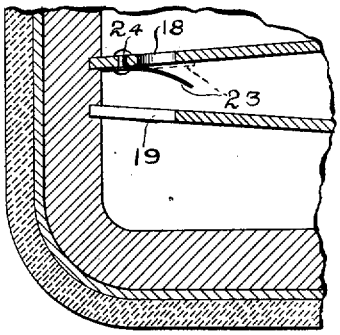
Figure 2:
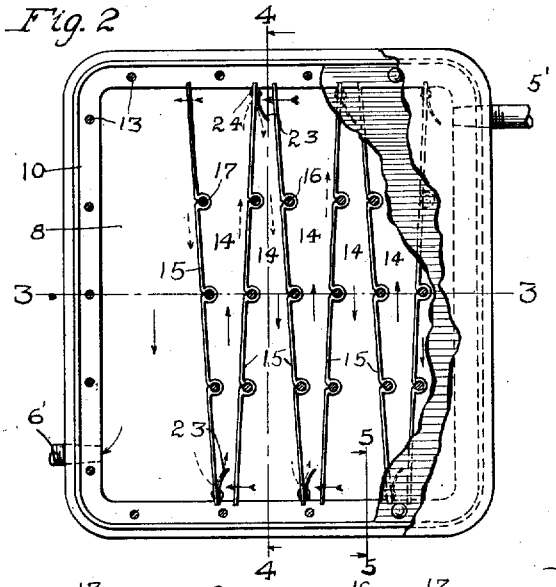
Figure 3:
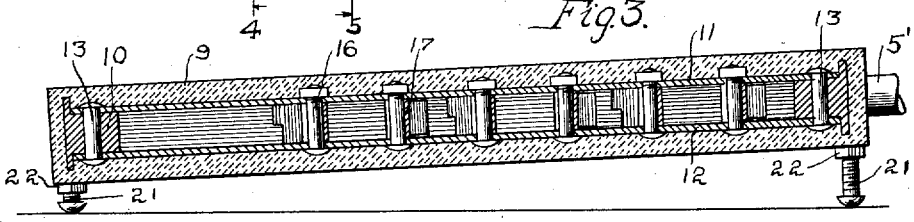
Figure 4:
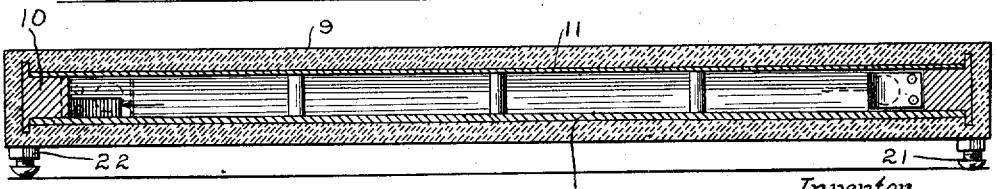

My invention will be more clearly understood by reference to the accompanying drawings in which:

Figure 1 is a vertical sectional view of a refrigerator provided with a water-cooling device, the whole embodying my invention; Fig. 2 is an enlarged top plan view of the water-cooling device, portions thereof being broken away for illustrative purposes; Fig. 3 is an enlarged transverse sectional view of the water-cooling device taken on the line 3—3 of Fig. 2; Fig. 4 is an enlarged longitudinal sectional view of the water-cooling device taken on the line 4—4 of Fig. 2; Fig. 5 is an enlarged detailed sectional view particularly illustrating one of the circulation controlling valves and taken on the line 5—5 of Fig. 2; and Fig. 6 is an enlarged fragmentary horizontal section taken on the line 6—6 of Fig. 5.

In the embodiment of my invention, as illustrated in the drawings, 1 is a refrigerator box which has an ice compartment 2, and 3 is my improved water-cooler and ice rest which I arrange in the lower part of the ice compartment and upon which the ice 4 is supported. This floor or device 3 is supported within the refrigerator 1, upon an open-work partition 5 whereby the ice compartment 2 is in free communication with the whole interior of the refrigerator. The water cooler 3 is provided at one point with an inlet pipe 5′, and at another point with an outlet pipe or connection 6. The inlet 5′ serves to supply unrefrigerated warm water to the water-cooler 3, and the outlet pipe may terminate in a with-drawing faucet 7. The device itself is a substantially flat, hollow structure having a chamber 8 therein which extends substantially throughout its whole interior. This chamber is filled with water which is free to circulate throughout the whole extent of the chamber. The chamber is protected from sudden changes of temperature from without by means of a coating or covering 9 formed of cement or some other suitable material which responds slowly or sluggishly to changes of temperature and this coating also prevents the rapid transfer of heat from the water within the chamber to the supported ice.

The cooler 3, as shown in the drawings, is built up of a substantially rectangular metal frame 10, having side or top and bottom plates 11 and 12 respectively secured thereto or carried thereby. These plates are arranged parallel with each other and are secured to the frame preferably by rivets 13, which pass through the frame and through both the plates. This construction provides the closed flat chamber 8, which, as stated hereinabove, contains the water. In the form of my device illustrated, I divide the chamber into a plurality of inter-connected pockets, cells or compartments 14, which are relatively of small cross-sectional area, and so arranged that when the fluid is withdrawn from the chamber, the flow to the outlet will be forced to pass through these compartments or cells in serial order from the inlet to the outlet. In other words, at this time the body of the fluid within the chamber is divided into a stream or column having one of its ends terminating at the inlet and the other at the outlet. I divide the chamber 8, into the compartments or cells 14, by means of vertically arranged partitions, walls or baffles 15, made preferably of sheet metal and making substantially tight joints with the frame 10 at their ends, and in order to strengthen the device so that it will properly withstand the internal pressure to which it is subjected in use when attached to water pressure pipes, I bolt the plates 11 and 12 together at a plurality of points by means of stay bolts 16, which bolts also serve to retain the partitions 15 in proper position. The bolt heads and nuts serve to form anchors for the cement coating and to protect them from rusting. I prefer to make this cement coating thick enough to completely cover or incase these parts. I form bolt sleeves 17 out of the partitions 15 by forming them with eyes to receive the bolts as shown in Fig. 2, for the purpose of keeping the structure as light as possible, and yet making it in such form that it will be substantially rigid when completed. These partitions 15 may be arranged within the chamber 8 in any suitable manner to provide conduits for the circulation of the water, which will permit the free circulation of the water therein between the various compartments in response to any changes of temperature at times when the outlet is closed, and which will cause the water to flow in a continuous stream from the inlet to the outlet, when the outlet is opened, but I prefer to arrange the partitions in alternately inclined positions, as shown in the drawings, wherein the cells 14 are shown as being wider at one end than they are at the other end, and I provide an opening 18 at one end of each partition intermediate between the top and bottom plates 11 and 12 and an opening 19 at the other end of each partition which extends from about the middle of the height of the partition to the bottom plate for the purpose of permitting the free circulation of the water throughout the chamber 8 when the outlet is closed, at which time the water circulates or passes freely through the cells 14 from one side to the opposite side of said chamber.

While my device will operate satisfactorily when placed in a substantially horizontal position, I prefer to place it in a slightly inclined position, as shown, the inlet being at the higher side and the outlet at the lower side for the purpose of causing a quicker circulation of the water within the chamber and at such times I place the block of ice 4 upon the higher portion of the device in which position it serves best to cause the circulation of the fluid within the chamber. For the purpose of supporting the refrigerating device rigidly in such inclined position, I provide feet or standards which are adjustable for the purpose of arranging the device so that its weight and the weight of the superposed ice will be properly carried upon the horizontal partition 5. These standards consist of bolts 21 which screw into the frame 10 and are provided with lock nuts 22 to hold them in position once they have been adjusted.

It will now be understood that the ice 4 being positioned upon the most elevated portion of the device, the water immediately beneath the ice will be chilled through the cement coating and upper plate, and consequently will fall or sink toward or upon the bottom plate and will naturally flow downward along the bottom through the various openings to the lower side of the device displacing the warmer water and forcing it upward along the upper plate to the upper portion of the device where it in turn is chilled and the circulation is thereby maintained. The cooler water following the bottom plate naturally takes the easiest path to the lower side of the device and flows through the various openings as indicated by the full line tailed arrows, and the warmer water in rising from the lower side or portion of chamber 8, to the higher side, flows along immediately beneath the upper plate and follows substantially in contact with the lower faces of the inclined partitions 15 until it reaches the raised openings 18, where it passes through from one cell or compartment into the next higher cell, where it flows slowly along beneath the upper or top plate in contact with the next higher partition to the opposite end of the device finding its way through the opening 18 thereat, consequently the chilled water in flowing downwardly through the device follows a relatively short path and the warmer water flowing upward through the device follows a much longer path. This feature is of advantage in that it retains the warmer water for a longer time in contact with the upper plate in which position it can best be refrigerated by the chilling or cooling effect of the ice.

In order to prevent the unchilled water from finding a free path directly from the inlet to the outlet when water is withdrawn from the chamber 8, I provide valves 23 which are adapted to automatically close the openings 18 and thereby prevent the water from flowing directly from the narrow end of the cell to its next adjacent cell and cause it to flow longitudinally through the cells in serial order flowing from one cell to the other, only through the openings 19 which are arranged at alternate ends of adjacent cells. These valves each consist of what might be termed a light flap valve made of very thin sheet metal attached or secured to the partition 14 by means of a rivet 24. When water is not being withdrawn from the device, these valves normally stand in the position shown in full lines in the drawings in which position the openings 18, in combination with the constantly open openings 19, connect the compartments 14 and provide free passages for the water from side to side of the chamber 8. When, however, the water is being withdrawn from the device, the current or flow of water produced therein, is sufficient to spring or press the valves 23 against the partitions to which they are attached, as indicated in dotted lines in Fig. 6, and thereby prevent a flow of water through the openings 18. The flow or circulation of the water within the chamber at times when the outlet is open, is through the valveless openings 19, and is indicated by the full line tailless arrows, and it is seen that the water at this time is compelled to pass through the chamber in an elongated or zigzag path and through each cell from end to end in a gradually widened path, and it is seen that all of the refrigerated or cool water within the chamber must be withdrawn from the chamber 8 in advance of the entering warm water. Further, the water enters at one corner of the device into the narrow end of the first compartment or cell and flows in serial order zigzag through the device through all the compartments in serial order from the upper or higher side of the device to the lower side thereof and is finally discharged from the wider end of the lowest compartment through the outlet which is arranged, in the device as illustrated, at the diagonally opposite corner from the inlet.

While many different substances might be used as a coating or an outer surface for the device which would be slowly responsive to changes of temperature, I prefer to form this coating or outer wall of Portland cement or some similar material which can be applied in a plastic form and thereafter changed into a permanent hard condition, and I find that even by the use of very fine grained sand and cement in the formation of this coating the upper surface is sufficiently rough to cause the ice to remain in position upon the higher or upper portion of the slightly inclined device. This effect is, of course, enhanced by the fact that the melting body of ice conforms substantially perfectly to the surface upon which it rests. A further desired result obtained by means of the inclination of the device is the perfect draining of the melting ice water from the upper surface thereof.

It will now be understood that my water-cooling device which consists in part of a relatively large mass of cement, which is slow to respond to temperature changes, protects the water contained within the device from the effect of warm air when the refrigerator is opened and likewise protects the ice from the rapid action of the entering warm water.

While I have specifically disclosed and described but one arrangement which I have devised to successfully carry out or practice my invention, it is obvious that many other devices and arrangements, which will fall within the scope of my invention, will readily suggest themselves to one skilled in the art, and I therefore do not limit or confine my invention to the specific structures herein shown and described.

I claim:—

1. In an ice rest for cooling water, a flat hollow casing having a flat upper surface adapted to support ice, and being provided with an inlet and an outlet for water, baffles in said casing extending between the sides thereof, said baffles being each inclined to form between adjacent baffles a series of gradually widening paths for water, and means for supporting said casing at an inclination whereby water may flow downwardly from the inlet through said series of paths from the narrower to the wider ends thereof.

2. In an ice rest for cooling water, a flat hollow casing having a flat upper surface for receiving ice and being provided with an inlet and a diagonally opposite outlet for water, baffles in said casing extending between the sides thereof adapted and arranged to provide a tortuous path therein from the inlet to the outlet, said baffles being each inclined to form between adjacent baffles a series of gradually widening transverse paths for water, and screw-threaded supports attached to the bottom of said casing whereby the casing may be held at an adjustable inclination to cause water to flow downwardly from said inlet into the narrow end of a transverse path, and successively through the remaining transverse paths from narrow to wider ends thereof, for discharge from the wider end of the last said transverse path through said outlet.

3. In an ice rest for cooling water, a flat hollow casing comprising a frame, opposite plates held in spaced relation by said frame to provide therebetween an inclosed water space, said frame being provided with an inlet and a diagonally opposite outlet opening for said inclosed space, baffles extending from side to side of said frame, said baffles being inclined in alternately opposite directions to provide a series of gradually widening transverse paths, and each baffle being provided with a perforation for flow of water therethrough from the wider portion of a transverse path into the narrower portion of the next succeeding path, and supporting means for said casing to hold the casing in adjustable inclination, whereby water may pass into said casing from the inlet, and downwardly toward said outlet successively through the transverse paths from narrower to wider ends thereof for discharge from the wider end of the last transverse path.

4. In a device of the character described, a flat hollow structure comprising a frame, parallel plates secured thereto, and baffle walls at intervals between said plates, and extending between opposite sides of the frame to form wedge-shaped channels therebetween, each channel being provided with a free opening at one end and a valved opening at the other, said valves adapted to be closed by the forcible passage of the water through the channels and means for inclining said structure, an inlet connection at the high side thereof for water under pressure, and an outlet connection at the lower side for discharge of water.

5. In a device of the character described, a flat hollow structure comprising a frame, parallel plates secured thereto, baffle-wall plates at intervals between said side walls, each plate partially surrounding stay bolts, and stay bolts taking through said side plates and within the openings provided within said baffle plates.

6. In a device of the character described, a flat hollow structure comprising a frame, parallel plates secured thereto, baffle wall plates at intervals between the side walls, stay bolts taking through said side plates, and a cement coating applied to the outside surface of said structure overlying the ends of said bolts to provide an even ice-retaining surface.

7. In an ice rest for cooling water, a receptacle having an inlet and an outlet, means for supporting said receptacle at an inclination to the horizontal, means in said receptacle providing a direct downward path for cooled water and a tortuous path for upwardly traveling warmer water, and a plastic material surrounding said receptacle to provide a substantially uniform integral coating sluggish in its response to temperature variations.

8. In an ice rest for cooling water, a receptacle having an inlet and an outlet, and a plastic material surrounding said receptacle to provide a substantially uniform integral coating relatively slow in response to temperature variation, said coating providing a substantially straight upper surface to receive ice.

9. In an ice rest for cooling water, a water receptacle having an inlet and an outlet, a plastic material surrounding said receptacle to provide an integral homogeneous coating, the upper surface of said coating being substantially straight for receiving thereon a body of ice, and supports for maintaining said receptacle at an adjustable inclination, and means whereby the cooling effect of said ice body acting through said coating impels a circulation of water throughout said receptacle.

10. In an ice rest for cooling water, a hollow flat receptacle, means for suporting said receptacle at an inclination, and baffles in said receptacle extending from side to side thereof, each baffle having at one end a perforation of slightly less diameter than the distance between the top and bottom of said casing and at its other end a perforation extending from the bottom of said casing to a point midway between the bottom and top thereof, whereby the cooling effect of a body of ice upon the upper edge of said receptacle may impel a circulation of water directly toward the lower edge of said casing and upwardly along the baffles, as described.

11. In a device of the character described, a flat hollow structure comprising a frame, parallel plates, secured thereto, baffle walls at intervals between said plates and extending between opposite sides of the frame to form channels, said plates provided with a free opening at one end and a valved opening at the other, said valves adapted to be closed by the forcible passage of water through said channels, and means for inclining said structure, an inlet connection at the high side thereof for water under pressure, and an outlet connection at the low side for discharge of water.

12. In a liquid cooler a main closed liquid containing chamber, an inlet and an outlet therefor, a plurality of transverse partitions within said chamber dividing it into a series of subsidiary chambers or cells, one end of the series being connected to the inlet and the opposite end being connected to the outlet, said partitions being provided with openings connecting the adjacent ends of adjacent cells and which permit substantially free circulation of the contents within the chamber in response to differences in temperature in different portions of the inclosed liquid, and valves within said chamber automatically closing the openings at opposite ends of adjacent cells when the outlet is open and liquid is being drawn from the chamber to cause the liquid to flow in a continuous stream from the inlet to the outlet through the series of subsidiary chambers from end to end.

13. In a device for cooling liquid, a structure provided with a closed chamber of relatively large dimensions for containing liquid to be cooled, a plurality of transverse partitions within the chamber dividing it into a series of substantially parallel subsidiary chambers or cells of relatively small cross-sectional area, an inlet connected to one end of the series, and an outlet connected to the other end of the series, the partitions being provided with openings at their ends permitting free circulation of the contents of the chamber in response to differences of temperature, and valves within said chamber adapted to automatically close the openings at opposite ends of adjacent partitions at times when liquid is being drawn from said chamber, whereby, at such times, a continuous conduit of relatively small cross-sectional area is provided extending from the inlet to the outlet.

In testimony whereof, I have hereunto set my hand this 2nd day of August, 1911, in the presence of the subscribing witnesses.

WALTER F. KEYES.

Witnesses:

EDWARD F. WILSON,

JOHN R. LEFEVRE.

Copies of this patent may be obtained for five cents each, by addressing the "Commissioner of Patents, Washington, D. C."